(12) United States Patent
Murty

(10) Patent No.: US 8,091,677 B2
(45) Date of Patent: Jan. 10, 2012

(54) SYSTEM AND METHOD OF DIFFERENTIATING ROTATIONAL SPEED AND TORQUE BETWEEN WHEELS OF A HYBRID VEHICLE

(75) Inventor: Balarama V. Murty, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 604 days.

(21) Appl. No.: 12/056,632

(22) Filed: Mar. 27, 2008

(65) Prior Publication Data
US 2009/0242289 A1 Oct. 1, 2009

(51) Int. Cl.
*B60W 10/04* (2006.01)

(52) U.S. Cl. .................. 180/293; 180/65.1; 180/65.265; 180/65.285

(58) Field of Classification Search .................. 180/292, 180/293, 65.1, 65.5, 65.6, 65.7, 65.265, 65.21, 180/65.285; 903/915, 946
See application file for complete search history.

(56) References Cited

U.S. PATENT DOCUMENTS

| | | | |
|---|---|---|---|
| 3,713,504 A * | 1/1973 | Shimer et al. ................. | 180/65.1 |
| 3,799,284 A * | 3/1974 | Hender ....................... | 180/65.25 |
| 6,024,182 A * | 2/2000 | Hamada et al. .............. | 180/6.28 |
| 6,089,341 A * | 7/2000 | Gingerich .................... | 180/65.1 |
| 6,164,400 A * | 12/2000 | Jankovic et al. ........... | 180/65.25 |
| 6,205,379 B1 | 3/2001 | Morisawa et al. | |
| 6,688,412 B2 * | 2/2004 | Kima et al. ................. | 180/65.51 |
| 6,719,109 B1 * | 4/2004 | Li et al. ......................... | 192/3.52 |
| 6,820,707 B1 * | 11/2004 | Cantemir .................... | 180/65.6 |
| 7,017,542 B2 * | 3/2006 | Wilton et al. ............... | 123/179.3 |
| 7,028,583 B2 * | 4/2006 | Bennett .......................... | 74/661 |
| 7,135,784 B2 * | 11/2006 | Murty et al. ................. | 290/36 R |
| 7,163,480 B2 * | 1/2007 | Supina et al. ..................... | 475/5 |
| 7,195,087 B2 * | 3/2007 | Hatsuda et al. ........... | 180/65.285 |
| 7,198,335 B2 * | 4/2007 | Choi .............................. | 303/152 |
| 7,255,187 B2 * | 8/2007 | Bell et al. ..................... | 180/65.25 |
| 7,334,670 B2 | 2/2008 | Namuduri et al. | |
| 7,363,995 B2 * | 4/2008 | Downs et al. ................. | 180/65.1 |
| 7,395,888 B2 * | 7/2008 | Yamamoto et al. ........ | 180/65.29 |
| 7,497,285 B1 * | 3/2009 | Radev ....................... | 180/65.225 |
| 7,532,968 B2 * | 5/2009 | Kadota ........................... | 701/55 |
| 7,632,202 B2 * | 12/2009 | Supina et al. ..................... | 475/5 |
| 2003/0094322 A1 * | 5/2003 | Bowen ......................... | 180/65.6 |
| 2003/0111280 A1 * | 6/2003 | Platner et al. ................ | 180/65.6 |
| 2006/0052198 A1 * | 3/2006 | Namuduri et al. ................. | 475/5 |
| 2006/0169506 A1 | 8/2006 | Handa et al. | |
| 2006/0225930 A1 * | 10/2006 | Schulte ........................ | 180/65.4 |
| 2007/0158119 A1 * | 7/2007 | Pascoe ......................... | 180/65.2 |
| 2009/0088914 A1 * | 4/2009 | Mizutani et al. ................ | 701/22 |
| 2009/0255746 A1 * | 10/2009 | Boesch ......................... | 180/197 |
| 2010/0243347 A1 * | 9/2010 | Uchiyama .................. | 180/65.22 |

FOREIGN PATENT DOCUMENTS

| | | |
|---|---|---|
| JP | 2006087166 A | 3/2006 |
| JP | 2007261467 A | 10/2007 |
| JP | 2007312596 A | 11/2007 |

* cited by examiner

*Primary Examiner* — J. Allen Shriver, II
*Assistant Examiner* — James Triggs
(74) *Attorney, Agent, or Firm* — Quinn Law Group, PLLC

(57) ABSTRACT

A powertrain for propelling a hybrid vehicle includes a front drivetrain, for driving a pair of front wheels, and a rear drivetrain, for driving a first and a second rear wheel, to propel the hybrid vehicle. First and second rear drive motors are operatively connected to the rear wheels to propel the hybrid vehicle. Energy is transmitted from an energy storage device to power and operate each of the first and second rear drive motors. Likewise, during regenerative braking, energy is transmitted from each of the rear drive motors to recharge the energy storage device. The first rear drive motor is operated independent of the second rear drive motor to transmit torque to vector torque between each of the rear wheels and control dynamics of the hybrid vehicle.

7 Claims, 3 Drawing Sheets

SYSTEM AND METHOD OF DIFFERENTIATING ROTATIONAL SPEED AND TORQUE BETWEEN WHEELS OF A HYBRID VEHICLE

TECHNICAL FIELD

The present invention relates to a system and a method of operating a powertrain to differentiate rotational speed and torque between wheels of a hybrid vehicle.

BACKGROUND OF THE INVENTION

A powertrain of a typical four-wheel-drive vehicle includes an engine, a transmission, a transfer case, front and rear driveshafts, and front and rear differentials. The transfer case is operatively connected to the transmission to direct power to front and/or rear wheels. The front driveshaft operatively connects the transfer case to the front differential and the rear driveshaft operatively connects the transfer case to the rear differential. The front differential drives the front wheels and the rear differential drives the rear wheels. During certain driving conditions, the transfer case is operated to direct power to only the rear wheels. In other driving conditions, i.e., in four-wheel-drive, the transfer case is operated to direct power to both the front and rear wheels.

SUMMARY OF THE INVENTION

A hybrid vehicle includes a powertrain and the hybrid vehicle has a first and a second rear wheel. The powertrain includes a first rear drive motor that is operatively connected to the first rear wheel for driving the first rear wheel. A second rear drive motor is operatively connected to the second rear wheel for driving the second rear wheel, independent of said first rear drive motor driving the first rear wheel. A first clutch mechanism operatively interconnects the first rear drive motor and the first rear wheel for selectively disengaging the first rear drive motor from the first rear wheel. A second clutch mechanism operatively interconnects the second rear drive motor and the second rear wheel for selectively disengaging the second rear drive motor from the second rear wheel.

A hybrid vehicle includes a pair of front wheels, a first rear wheel, a second rear wheel, and a chassis. A front drivetrain is supported by the chassis and operatively connected to the front wheels for driving the front wheels to propel the hybrid vehicle. A first rear drive motor is operatively connected to the first rear wheel for driving the first rear wheel to propel the hybrid vehicle. A second rear drive motor is operatively connected to the second rear wheel for driving the second rear wheel to propel the hybrid vehicle. An energy storage device is operatively connected to each of the first and second rear drive motors to transmit power to the first and second rear drive motors and independently drive each of the first and second rear wheels to propel and control dynamics of the hybrid vehicle. A rear cradle is supported by the chassis and is disposed between the rear wheels. The first and second rear drive motors are supported by the rear cradle.

A method of vectoring torque to control and propel a hybrid vehicle includes transmitting energy from a hybrid battery to a first and second rear motor. The first rear motor is operated to transmit torque to a first rear wheel to rotate the first rear wheel and propel the hybrid vehicle. The second rear motor is operated to transmit torque to a second rear wheel to rotate the second rear wheel and propel the hybrid vehicle.

By driving each of the rear wheels independently, differentiation of a rotational speed and/or torque between each of the rear wheels may be achieved without the use of components such as a transfer case, front and rear driveshafts, and differentials that add cost, weight, and complexity to the hybrid vehicle. Elimination of these components can improve fuel economy through weight reduction and by reducing a drag that is associated with rotating these components to propel the hybrid vehicle. Additionally, traction control of the hybrid vehicle may also be provided based on the ability to operate each of the rear wheels independent of one another, based on driving conditions.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
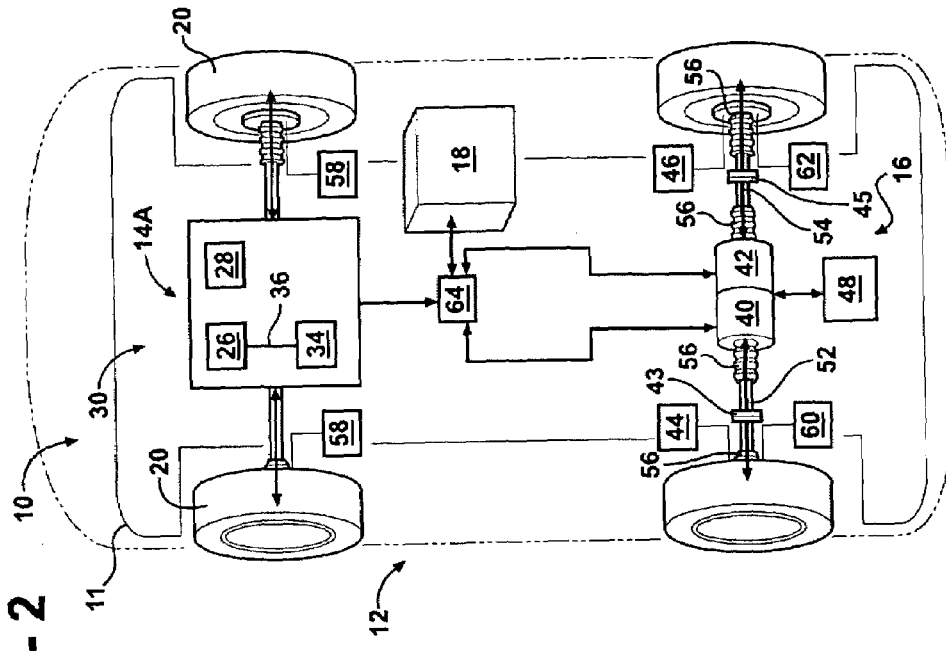
FIG. 1 is a schematic view of a hybrid vehicle illustrating a powertrain having a front drivetrain and a rear drivetrain for propelling the hybrid vehicle.

Referring to the drawings, wherein like reference numbers refer to like components, FIG. 1 shows a powertrain for propelling a hybrid vehicle 12 at 10. The hybrid vehicle includes a chassis 11. The powertrain 10 includes a front drivetrain 14 and a rear drivetrain 16 that are supported by the chassis 11. One, or both, of the front and rear drivetrains 14, 16 draw power from an energy storage device 18 to propel the hybrid vehicle 12. The energy storage device 18 is a hybrid battery, a fuel cell, a ultra-capacitor, etc. that may be in addition to a standard accessory battery for powering accessories of the hybrid vehicle 12, such as headlamps, a radio, etc. The hybrid vehicle 12 includes a pair of front wheels 20 and a pair of rear wheels 22, 24. The rear wheels 22, 24 include a first rear wheel 22 and a second rear wheel 24. The front drivetrain 14 is operatively connected to the front wheels 20 to drive, i.e., rotate, the front wheels 20 and propel the hybrid vehicle 12. Likewise, the rear drivetrain 16 is operatively connected to the rear wheels 22, 24 to drive the rear wheels 22, 24 and propel the hybrid vehicle 12.

Figure 2:
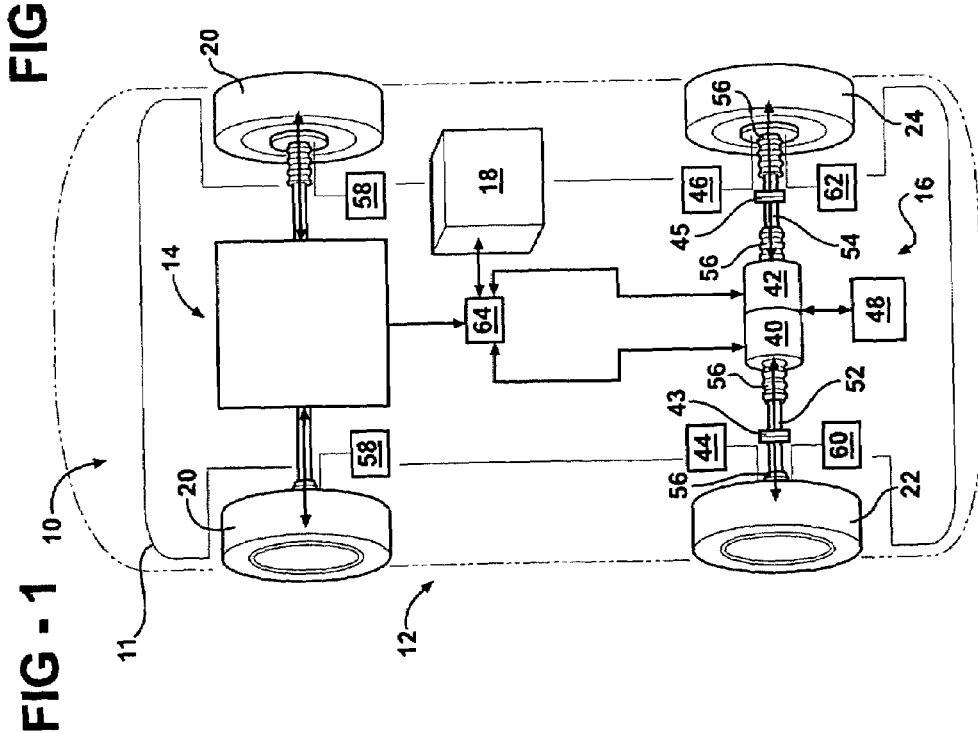
FIG. 2 is a schematic view of an embodiment of the hybrid vehicle of FIG. 1 illustrating the front drivetrain that is a belted alternator starter system.
Figure 3:
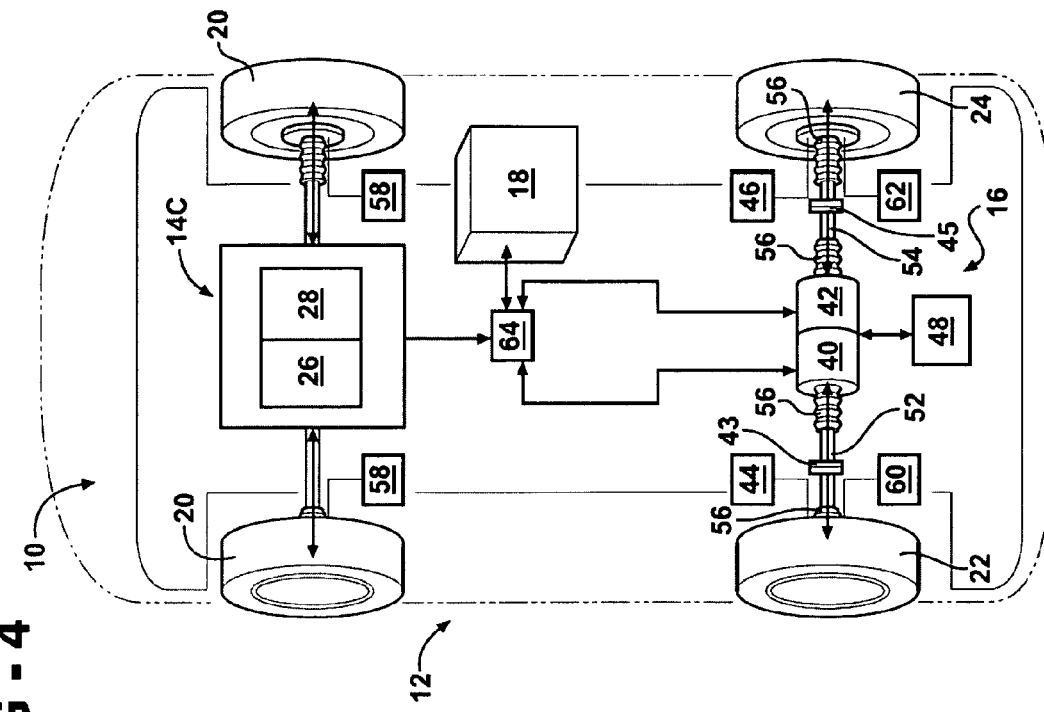
FIG. 3 is a schematic view of another embodiment of the hybrid vehicle of FIG. 1 illustrating the front drivetrain that is a full hybrid system.

The front drivetrain 14 includes an engine 26 and a transmission 28, as shown in FIG. 2. The engine 26 and transmission 28 are of the type that is known to those skilled in the art. Referring to FIGS. 2 and 3, the front drivetrain 14 may be a hybrid system 14A, 14B that is operatively connected to the energy storage device 18, e.g. a belted alternator starter system (BAS system) 30, a full hybrid system 32, etc. The energy storage device 18 is rechargeable and has a large enough electrical capacity for supporting the functionality of the hybrid system of the front drivetrain 14. Therefore, the front hybrid system 14A, 14B can be configured to generate power to recharge the energy storage device 18. Referring specifically to FIG. 2, the BAS system 30 is a "stop/start" system that is attached to the engine 26, as shown in FIG. 2. The engine 26 of the hybrid vehicle 12 shuts off during certain driving conditions, such as when the hybrid vehicle 12 is stopped. The BAS system 30 includes a belt-driven starter generator 34 and an accessory belt 36 that operatively interconnects the engine 26 and the belt-driven starter generator 34. The BAS system 30 draws power from the energy storage device 18 for the starter generator 34 to restart the engine 26 via the accessory belt 36 when the hybrid vehicle 12 is ready to be propelled.

Referring specifically to FIG. 3, the full hybrid system 32 uses the engine 26 for driving the front wheels 20 of the hybrid vehicle 12 to propel the hybrid vehicle 12. However, a front motor 38 provides additional power to drive the front wheels 20. The front motor 38 is electric and is powered by the energy storage device 18 to drive the front wheels 20. In addition, full hybrid systems 32 can use the electric front motor 38 as the sole source of propulsion for low-speed, low-acceleration driving, such as in stop-and-go traffic or for backing up. This electric-only driving mode of the fully hybrid system 32 can further increase fuel efficiency under some driving conditions. Alternatively, the full hybrid system 32 includes two electric front motors 38. The electric motors 38 may be incorporated in the transmission 28. One of the front motors 38 drives the front wheels 20 and the other front motor 38 may operate as a generator to generate electricity to charge the energy storage device 18, e.g., through regenerative braking, etc., as required. It should be appreciated that the full hybrid system 32 is not limited to having one or two front motors 38, but may have any desired number of front motors 38 that are configured to drive the front wheels and/or charge the energy storage device 18, as known to those skilled in the art.

Figure 4:
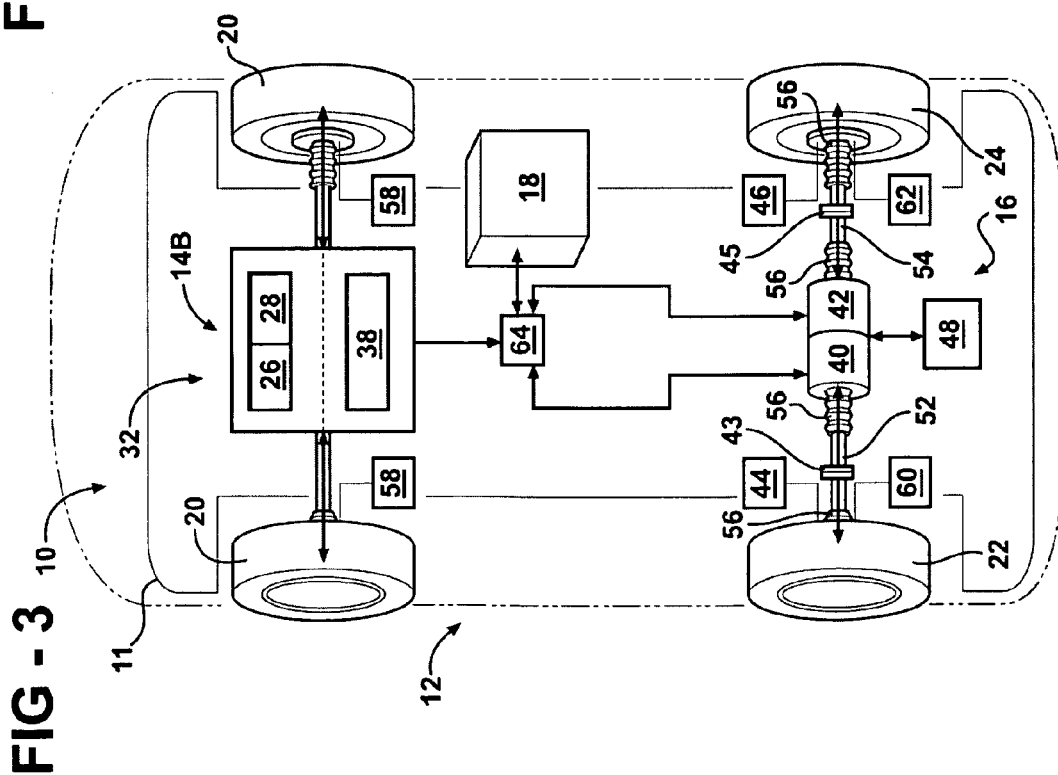
FIG. 4 is a schematic view of yet another embodiment of the hybrid vehicle of FIG. 1 illustrating the front drivetrain that is an engine and transmission.

In another embodiment, a front drivetrain 14C uses only the engine 26 and transmission 28, as shown in FIG. 4, without the hybrid systems shown in FIGS. 2 and 3. In this configuration, the power for the front drivetrain 14 is only derived from the engine 26, without the aid of the energy storage device 18. However, those skilled in the art will recognize that the front drivetrain 14A, 14B, 14C of the present invention is not limited to being a BAS system 30, a full hybrid system 32, or engine 26, but may be any acceptable configuration known to those skilled in the art for driving the front wheels 20 to propel the hybrid vehicle 12.

Referring generally to FIGS. 1-4, the rear drivetrain 16 includes a first rear drive motor 40 and a second rear drive motor 42 which are operatively connected to the energy storage device 18. The energy storage device 18 supplies power to both of the rear drive motors 40, 42 to drive the rear wheels 22, 24 and propel the hybrid vehicle 12. Therefore, the energy storage device 18 is of the type that has sufficient capacity for also supplying power to the rear drivetrain 16. It should be appreciated, however, that the invention is not limited to using only a single energy storage device 18 for both the front and rear drivetrain 16. For example, each of the front and rear drivetrains 14, 16 may have one or more separate hybrid batteries.

The first rear drive motor 40 receives power from the energy storage device 18 to transmit torque to the first rear wheel 22 to rotate the first rear wheel 22 and propel the hybrid vehicle 12. The second rear drive motor 42 receives power from the energy storage device 18 to transmit torque to the second rear wheel 24 to rotate the second rear wheel 24 to propel the hybrid vehicle 12. This means that when the front drivetrain 14 is driving the front wheels 20 and the rear drivetrain 16 is driving the rear wheels 22, 24, a four-wheel-drive hybrid vehicle 12 may be achieved. Additionally, because the first rear drive motor 40 is configured to drive the first rear wheel 22 independent of the second rear drive motor 42 driving the second rear wheel 24, the ability to drive each of the rear wheels 22, 24 independently from one another can be achieved. Therefore, the first and second rear drive motors 40, 42 replace a mechanical differential that is included in a typical vehicle. While the mechanical differential can only differentiate rotational speed between the first and second rear wheels 22, 24, the independent operation of the rear wheels 22, 24 via the rear drive motors 40, 42 can allow for speed and/or torque differentiation between the first and second rear wheels 22, 24. For speed differentiation, this means, that the first rear wheel 22 can rotate at a different speed than the second rear wheel 24. For example, when one or both of the rear wheels 22, 24 are on slippery pavement, the rotational speed of one or both of the rear wheels 22, 24 can be slowed down to improve traction between the rear wheel(s) 22, 24 and the pavement. For torque differentiation, this means that a different torque can be applied to the first and second rear wheels 22, 24 to achieve torque vectoring. Torque vectoring allows the simultaneous application of a positive torque to one of the rear wheels 22, 24 and a negative torque to the other rear wheel 22, 24, i.e., accelerating one of the rear wheels 22, 24 while decelerating the other one of the rear wheels 22, 24. For example, if the hybrid vehicle 12 is experiencing a yaw moment in one direction, a "yawing correction" can be applied to one of the rear wheels 22, 24 to correct or eliminate the yaw moment. To correct or eliminate the yaw moment, the negative torque is applied to the rear wheel 22, 24 on a side of the hybrid vehicle 12 that is opposite the direction of the yaw moment and the positive torque is applied to the rear wheel 22, 24 that is on the same side as the direction of the yaw moment to cancel out the yaw moment. The negative torque that is applied to the rear wheel 22, 24 operates to decelerate rotation of the rear wheel 22, 24 and the positive torque that is applied to the rear wheel 22, 24 operates to accelerate rotation of the rear wheel 22, 24 until the yaw moment is reduced or eliminated. Therefore, the direction and magnitude of the torque applied to the rear wheels 22, 24 by the two rear drive motors 40, 42 is determined based on the correction that is required to counter the yaw motion at any time. Since either of the rear drive motors 40, 42 can produce torque in either of rotational direction with a short time constant, the vehicle stability can be restored quickly.

The rear drive motors 40, 42 may be geared. In one embodiment, the rear drive motors 40, 42 include a single stage gear reduction. The single stage gear reduction reduces the weight of the rear drive motors 40, 42, while still providing torque required for driving the rear wheels 22, 24. The gear reduction allows for application of a higher torque to the rear wheels 22, 24, as compared to when there is no gear reduction within the rear drive motors 40, 42. It should be appreciated that the gear reduction is not limited to being the single stage gear reduction as more stages can be used as known to those skilled in the art to apply torque and drive the rear wheels 22, 24 to propel the hybrid vehicle 12.

A first clutch mechanism 43 may be disposed between the first rear drive motor 40 and the first rear wheel 22 and a second clutch mechanism 45 may be disposed between the second rear drive motor 42 and the second rear wheel 24. The clutch mechanisms 43, 45 operate to disconnect the rear drive motors 40, 42 from the respective rear wheels 22, 24 when the rear drive motors 40, 42 are not operating. Disconnecting the rear drive motors 40, 42 from the rear wheels 22, 24 reduces frictional losses that would typically result if the rear drive motors 40, 42 were not disconnected from the rear wheels 22, 24. When the hybrid vehicle 12 is being propelled by only the front drivetrain 14, the rear wheels 22, 24 are still rotating, but are not being driven by the rear drive motors 40, 42. If the rear wheels 22, 24 are not disconnected from the rear drive motors 40, 42 via the clutch mechanisms 43, 45, then the rear wheels 22, 24 may "back-drive" the rear drive motors 40, 42, resulting in a "drag" on the rear drivetrain 16 that can result in a reduction in fuel economy for the hybrid vehicle 12.

In one embodiment, a first rear speed sensor 44 is operatively connected to the first rear wheel 22 for sensing a rotational speed of the first rear wheel 22. A second rear speed sensor 46 is operatively connected to the second rear wheel 24 for sensing a rotational speed of the second rear wheel 24. In response to sensing the rotational speeds of each of the rear wheels 22, 24, one or both of the rotational speeds of the rear wheels 22, 24 can be changed to meet conditions of the road. For example, when one or more of the wheels are on slippery pavement and the rotational speed between the first and second rear wheels 22, 24 are different, as sensed by the first and/or second rear speed sensors 44, 46, a signal is sent from a controller 64 to the rear drive motors 40, 42 to supply torque to only one of the rear wheels 22, 24 that has traction with the pavement. The signal would serve to rotate only one of the rear wheels 22, 24 that has traction with the pavement to get the hybrid vehicle 12 unstuck, while not rotating the other of the rear wheels 22, 24 that is on the slippery pavement.

In addition, the hybrid vehicle 12 may be equipped with a traction control system 48 to sense if the one or both of the rear wheels 22, 24 are on pavement with low traction, e.g., snow, ice, mud, etc. When low traction is sensed, the traction control system 48 may operate to send power from the energy storage device 18 to only one of the rear drive motors 40, 42 to rotate only one of the rear wheels 22, 24 to provide improved traction between the rear wheels 22, 24 and the pavement while propelling the hybrid vehicle 12.

In another scenario, when the hybrid vehicle 12 is stuck, e.g., snow, ice, mud, in a rut, etc., the traction control system 48 may operate to "rock" the hybrid vehicle 12 in a fore and aft direction. Rocking the hybrid vehicle 12 is achieved by quickly pulsing the rear drive motors 40, 42 between a positive rotational direction, i.e. sending a positive torque to the rear wheels 22, 24 to rotate the rear wheels 22, 24 in the positive rotational direction, and a negative rotational direction, i.e. sending a negative torque to the rear wheels 22, 24 to rotate the wheels in the negative rotational direction, opposite the positive rotational direction. For example, in one embodiment, the rotational direction of the rear wheels 22, 24 is changed every 100-150 milliseconds. It should be appreciated, however, that more or less time can be used to change the rotational direction of the rear drive motors 40, 42.

In another embodiment, the rear drivetrain 16 is used to improve fuel economy of the hybrid vehicle 12 by launching the hybrid vehicle 12 from a stop using only the rear drive motors 40, 42 before activating the front drivetrain 14. After the hybrid vehicle 12 is launched, the rear drive motors 40, 42 may or may not be deactivated.

In one embodiment, each rear drive motor 40, 42 is an induction motor. One type of induction motor is 3-phase AC induction motor where power is supplied to a rotating device within the induction motor by electromagnetic induction. It should be appreciated that the motors are not limited to being induction motors, but may be any type of motor known to those skilled in the art.

Figure 5:
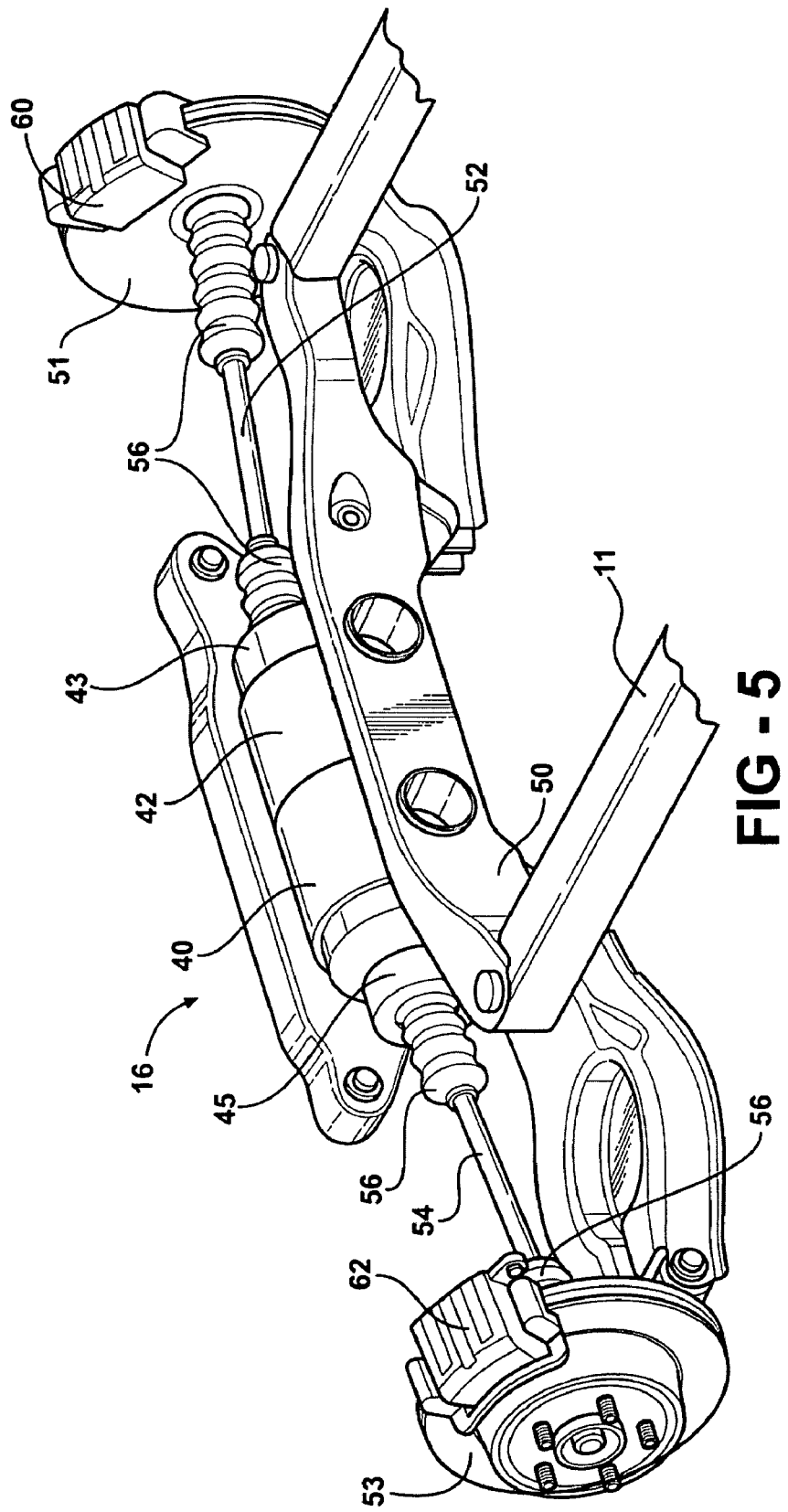
FIG. 5 is a front perspective view of the rear hybrid system of the hybrid vehicle that includes a pair of rear motors mounted to a cradle.

Referring to FIG. 5, a rear cradle 50 is disposed between the rear wheels 22, 24. The rear cradle 50 is supported by the chassis 11. In one embodiment, the rear cradle 50 supports each of the rear drive motors 40, 42. A first halfshaft 52 extends between the first rear drive motor 40 and a first rotor 51 of the first rear wheel 22 to operatively interconnect the first rear drive motor 40 and the first rotor 51. The first halfshaft 52 transfers a rotational output from the first rear drive motor 40 to the first rear wheel 22. A second halfshaft 54 operatively interconnects the second rear drive motor 42 and a second rotor 53 of the second rear wheel 24. The second halfshaft 54 transfers a rotational output from the second rear drive motor 42 to the second rotor 53. A CV joint 56 is disposed between each of the halfshafts and the respective rear wheel 22, 24. The CV joint 56 is of the type known to those skilled in the art and allows articulation between each of the rear wheels 22, 24 and the rear cradle 50.

In another embodiment, the rear drive motors 40, 42 are mounted directly to a respective rear wheel 22, 24, i.e., "wheel motors". This means that the first rear drive motor 40 is mounted directly to the first rear wheel 22 and the second rear drive motor 42 is mounted directly to the second rear wheel 24. In this configuration, since the rear drive motors 40, 42 are not mounted to the rear cradle 50, halfshafts are not required to drive the rear wheels 22, 24 to propel the hybrid vehicle 12. It should be appreciated that the rear drive motors 40, 42 are not limited to being mounted to the rear cradle 50 or to the rear wheels 22, 24 as any other mounted configuration known to those skilled in the art may also be used.

Referring again to FIG. 1, the front wheels 20 include a pair of front brakes 58 and the rear wheels 22, 24 include a pair of rear brakes 60, 62. The first rear wheel 22 includes a first rear brake 60 and the second rear wheel 24 includes a second rear brake 62. More specifically, referring to FIG. 5, the first rear wheel 22 includes a first rear rotor 51 and the first rear brake 60 is operatively connected to the first rear rotor 51. The second rear wheel 24 includes a second rear rotor 53 and the second rear brake 62 is operatively connected to the second rear rotor 53. The front and rear brakes 58, 60, 62 may be of the type known to those skilled in the art for mechanically or hydraulically applying pressure to the respective front and rear wheels 20, 22, 24 to decelerate and/or stop rotation of the front and rear wheels 20, 22, 24 and decelerate and/or stop the hybrid vehicle 12.

In addition to using the first and second rear drive motors 40, 42 to drive the rear wheels 22, 24 to propel the hybrid vehicle 12, the first and second rear drive motors 40, 42 can be operated to decelerate the hybrid vehicle 12 by reducing the rotational velocity of the rear wheels 22, 24. In this embodiment, the first and second rear drive motors 40, 42 can be configured as generators to generate power to recharge the energy storage device 18, i.e., "regenerative braking". As the rear drive motors 40, 42 are operated to decelerate rotation of the rear wheels 22, 24, electric energy is generated within the rear drive motors 40, 42. Kinetic energy that is associated with propelling the hybrid vehicle 12 is converted to electrical energy within one or both of the rear drive motors 40, 42. The controller 64 is disposed between the rear drive motors 40, 42 and the energy storage device 18. One of the functions of the controller 64, or a converter (not shown), is to convert the AC electrical energy within the rear drive motors 40, 42 to DC power for the energy storage device 18. The electrical energy flows from the rear drive motors 40, 42 and is absorbed into the energy storage device 18 as DC power to recharge the energy storage device 18. The controller 64 may also be disposed within the hybrid vehicle 12 to sense or receive a signal that the rotational speed of one or both of the rear wheels 22, 24 needs to be reduced. The controller 64, or an inverter (not shown), may operate to invert DC power from the energy storage device 18 to AC power that is required to operate the rear drive motors 40, 42. A state of charge of a voltage of the energy storage device 18 is sensed to determine whether the voltage of the energy storage device 18 is below a threshold level. If the state of charge of the energy storage device 18 is below the threshold level, then the state of charge of the energy storage device 18 is low enough to allow the energy storage device 18 to be recharged. If the state of charge of the energy storage device 18 is above the threshold level, then the state of charge of the energy storage device 18 is too high to be recharged and the first and second rear drive motors 40, 42 are not operated to slow the rotation of the rear wheels 22, 24 and generate power to recharge the energy storage device 18. Instead, the front and/or rear brakes 58, 60, 62 are operated to slow rotation of the front and rear wheels 20, 22, 24. Therefore, the front and/or rear brakes 58, 60, 62 are operated as a mechanical backup to the rear drive motors 40, 42 for slowing rotation of the rear wheels 22, 24 when the energy storage device 18 is above the threshold level and the rotation of the rear wheels 22, 24 are slowed by operation of the rear drive motors 40, 42 only when the state of charge of the energy storage device 18 is below the threshold level.

While the best modes for carrying out the invention have been described in detail, those familiar with the art to which this invention relates will recognize various alternative designs and embodiments for practicing the invention within the scope of the appended claims.

The invention claimed is:

1. A powertrain for propelling and controlling a hybrid vehicle having a first and a second rear wheel and a pair of front wheels, said powertrain comprising:
 a front drivetrain operatively connected to the pair of front wheels for driving the pair of front wheels to propel the vehicle;
 wherein said front drivetrain is a fully hybrid system including an engine and at least one front motor;
 wherein each of the engine and said at least one front motor are operatively connected to the pair of front wheels for driving the pair of front wheels to propel the hybrid vehicle;
 a first rear drive motor operatively connected to the first rear wheel for driving the first rear wheel;
 a second rear drive motor operatively connected to the second rear wheel for driving the second rear wheel, independent of said first rear drive motor driving said first rear wheel; and
 a controller operatively connected to each of said first and second rear drive motors and said at least one front motor and configured for operating at least one of said motors;
 wherein each of said rear drive motors are responsive to said controller to send torque to the first and second rear wheels to differentiate at least one of a torque and a rotational speed between each of the rear wheels;
 wherein each of said rear drive motors is responsive to said controller to reduce the torque to the first and second rear wheels to decelerate the hybrid vehicle;
 an energy storage device operatively connected to the first and second rear drive motors and said at least one front motor;
 wherein said energy storage device is configured to transmit power to said first and second rear drive motors to drive the first and second rear wheels;
 wherein said energy storage device is configured to receive power from said first and second rear drive motors upon reduction of torque to the first and second rear wheels to decelerate the hybrid vehicle;
 wherein said energy storage device is configured to transmit power to said at least one front motor to drive the pair of front wheels; and
 wherein said fully hybrid system is configured to selectively power said at least one front motor as a sole source of propulsion for the hybrid vehicle.

2. A powertrain, as set forth in claim 1, further comprising:
 a first clutch mechanism operatively interconnecting said first rear drive motor and said first rear wheel for selectively disengaging said first rear drive motor from the first rear wheel; and
 a second clutch mechanism operatively interconnecting said second rear drive motor and said second rear wheel for selectively disengaging said second rear drive motor from the second rear wheel.

3. A powertrain, as set forth in claim 1, wherein said rear drive motors are induction motors.

4. A powertrain, as set forth in claim 3, wherein said rear drive motors include at least a single stage gear reduction.

5. A powertrain, as set forth in claim 1, further comprising a first halfshaft operatively interconnecting said first rear drive motor and the first rear wheel and a second halfshaft operatively interconnecting said second rear drive motor and the second rear wheel.

6. A powertrain, as set forth in claim 1, further comprising a speed sensor operatively connected to the first and second rear wheels for sensing a rotational speed of each of the first and second rear wheels.

7. A hybrid vehicle comprising:
 a pair of front wheels;
 a first rear wheel;
 a second rear wheel;
 a chassis;
 a front drivetrain supported by said chassis and operatively connected to said front wheels for driving said front wheels to propel the hybrid vehicle;
 wherein said front drivetrain is a fully hybrid system including an engine and at least one front motor;
 wherein each of said engine and said at least one front motor are operatively connected to said pair of front wheels for driving said pair of front wheels to propel the hybrid vehicle;
 a first rear drive motor operatively connected to said first rear wheel for driving said first rear wheel to propel and decelerate the hybrid vehicle;
 a second rear drive motor operatively connected to said second rear wheel for driving said second rear wheel to propel and decelerate the hybrid vehicle;
 an energy storage device operatively connected to each of said motors;
 wherein said energy storage device is configured to transmit power to said first and second rear drive motors and independently drive each of said first and second rear wheels to propel and control dynamics of the hybrid vehicle;
 wherein said energy storage device is configured to receive power from said first and second rear drive motors upon deceleration of the hybrid vehicle with said first and second rear drive motors;
 a rear cradle supported by said chassis and disposed between said rear wheels with said first and second rear drive motors supported by said rear cradle;
 wherein said energy storage device is configured to transmit power to said at least one front motor and independently drive said pair of front wheels; and
 wherein said fully hybrid system is configured to selectively power said at least one front motor as a sole source of propulsion for the hybrid vehicle.

\* \* \* \* \*